(12) United States Patent
Gao et al.

(10) Patent No.: US 10,186,854 B2
(45) Date of Patent: Jan. 22, 2019

(54) CIRCUIT PROTECTION DEVICE WITH SELF FAULT DETECTION FUNCTION

(71) Applicant: JIAXING SHOUXIN ELECTRICAL TECHNOLOGY CO., LTD., Pinghu, Zhejiang Province (CN)

(72) Inventors: Shaohua Gao, Pinghu (CN); Qianhui Gao, Pinghu (CN)

(73) Assignee: JIAXING SHOUXIN ELECTRICAL TECHNOLOGY CO., LTD., Pinghu (CN)

( * ) Notice: Subject to any disclaimer, the term of this patent is extended or adjusted under 35 U.S.C. 154(b) by 237 days.

(21) Appl. No.: 15/253,246

(22) Filed: Aug. 31, 2016

(65) Prior Publication Data

US 2017/0338643 A1 Nov. 23, 2017

(30) Foreign Application Priority Data

May 20, 2016 (CN) .......................... 2016 1 0339793

(51) Int. Cl.
*H02H 3/16* (2006.01)
*H02H 3/33* (2006.01)
*H02H 3/04* (2006.01)
*H02H 7/00* (2006.01)

(52) U.S. Cl.
CPC .............. *H02H 3/162* (2013.01); *H02H 3/04* (2013.01); *H02H 7/008* (2013.01)

(58) Field of Classification Search
CPC .............. H02H 3/16; H02H 3/162; H02H 3/33
USPC ........................................................... 361/42
See application file for complete search history.

(56) References Cited

U.S. PATENT DOCUMENTS

| 8,405,939 | B2 * | 3/2013 | Haines | H02H 9/00 361/42 |
|---|---|---|---|---|
| 9,362,077 | B2 * | 6/2016 | Finlay, Sr. | H02H 3/338 |
| 2011/0222194 | A1 * | 9/2011 | Kinsel | H02H 3/335 361/42 |
| 2016/0141862 | A1 * | 5/2016 | Endozo | H01H 9/54 361/115 |

* cited by examiner

*Primary Examiner* — Dharti Patel
(74) *Attorney, Agent, or Firm* — Jiwen Chen

(57) ABSTRACT

The invention discloses a circuit protection device with self fault detection function. The ground fault protection unit comprises a ground fault detection circuit, an AC power supply path and an electromagnetic drive circuit. The self fault detection unit comprises an automatic detection circuit and a control circuit. The control circuit starts periodically a self fault detection process, controls the automatic detection circuit to generate a ground fault current GFC to the ground fault protection unit, and detects the fault status signal from the electromagnetic drive circuit. Based on the fault status signal, operation situations of the ground fault protection unit can be determined. If a fault occurs, an emergency interruption signal is generated, and that activates the electromagnetic drive circuit to make the ground fault protection unit trip in emergency, and cut off the AC power supply on load and socket terminals, and thus the emergency protection function is achieved. The ground fault protection unit utilizes an electromagnetic drive circuit which comprises two silicon controlled rectifiers, so that the reliability of the circuit protection device can be improved.

8 Claims, 2 Drawing Sheets

CIRCUIT PROTECTION DEVICE WITH SELF FAULT DETECTION FUNCTION

The present application claims the priority benefit of Chinese Application No. 201610339793.9, filed May 20, 2016, which is hereby incorporated by reference.

TECHNICAL FIELD

The present invention relates to an electrical circuit protection device, and in particular, it relates to a circuit protection device with self fault detection function, and a leakage current protection device or a ground fault circuit interruption device. The protective circuit interrupter can automatically detect the operation condition, and generate alarming signals in case of operation faults, and take emergency power off measure.

BACKGROUND OF THE INVENTION

The leakage current protection device, or the ground fault circuit interrupter, is used to detect the ground fault current in electrical systems, instruments, devices, equipment and power supply systems, when the ground fault current exceeds a specified limit, the circuit protection device will automatically shut down the power supply and so as to protect human being and properties. In actual application, the leakage current protection device or the ground fault circuit interrupter may partly or wholly malfunction, and their protection functions thereby malfunction, and safety risk may occur without the knowledge of the users.

To solve the problems above, some leakage current protection devices are designed according to standard such as IEC 61008-1, IEC 61009-1, GB 6829.1 and have a test button, but their users have to depress the test button periodically to test whether the circuit protection function is working properly. For one aspect, it increases users' workload, and for another, during the periodic test, the power supply must be cut off, and that causes inconvenience to users. Thirdly, if the users do not periodically test the circuit, or the circuit protection device malfunctions between two periodic tests (such as one month), the users may not timely discover that the circuit protection device loses protection ability and safety risk may similarly occur.

To solve the problems mentioned above, some ground fault circuit interrupters designed according to UL 943 standard are available with self fault detection functions to detect and diagnose the operation condition of the ground fault circuit interrupter, and generate alarming signals when the ground fault circuit interruption function fails. Some ground fault circuit interrupters are provided with self fault detecting, alarming and protection interruption functions, but their structure are complex, so it results in manufacturing difficulties and high cost, and thus the reliability of the circuit protection function of the device is reduced, and safety risk may occur.

SUMMARY OF THE INVENTION

The present invention is an extension of CN 101295609B and CN 201510206672.2, and supplies a circuit protection device with self fault detection function. The contents described in patent CN101295609B and CN201510206672.2 will be incorporated in the present patent. The technical problem to be solved by the present invention is to provide an emergency protection triggering circuit for the protective circuit interrupter. When the ground fault protection function of the protective circuit interrupter fails, the emergency protection triggering circuit can activate the tripping device of the ground fault protection device to cut off the AC power supply on load sides, and realize the emergency protection function. The other technical problem to be solved by the present invention is to provide an electromagnetic drive circuit with two silicon controlled rectifiers for the protective circuit interrupter to improve the reliability of the emergency protection function.

To solve the technical problems above, the technical scheme adopted in the present invention is:

A circuit protection device with self fault detection function comprising a ground fault protection unit and a self fault detection unit. The ground fault protection unit can achieve a ground fault protection function. The self fault detection unit detects operation conditions of the ground fault protection unit, and achieves a self fault detection function and an emergency protection function.

The ground fault protection unit comprises a ground fault detection circuit, an AC power supply path and an electromagnetic drive circuit. The ground fault detection circuit detects a ground fault current GFC on the AC power supply path, and generates a ground fault interruption signal U_GFI, and activates the electromagnetic drive circuit to operate.

The self fault detection unit comprises an automatic detection circuit and a control circuit. The control circuit periodically starts a self fault detection process, controls the automatic detection circuit to output the ground fault current GFC to the ground fault protection unit, and detects a fault status signal U_FS from the electromagnetic drive circuit, and so the self fault detection is achieved. Based on the fault status signal U_FS, operation situations of the ground fault protection unit can be determined. If a fault is determined, the control circuit outputs an emergency interruption signal U_EI to activate the electromagnetic drive circuit, making the ground fault protection unit trip in emergency to cut off the AC power supply on load and socket terminals, and thus the emergency protection function is achieved.

Wherein, the AC power supply path comprises a magnetic switch, input terminals of AC power supply, load and socket terminals. The magnetic switch is used to connect or disconnect the electrical path between input terminals of AC power supply and load and socket terminals.

The ground fault protection unit further comprises a manual test circuit which is used to generate manually the ground fault current GFC on the AC power supply path. The ground fault detection circuit detects the ground fault current GFC on the AC power supply path, and generates the ground fault interruption signal U_GFI to activate the electromagnetic drive circuit to make the magnetic switch trip, and cut off the AC power supply on load and socket terminals, and thus a manual detection function for ground faults is achieved.

When the ground fault detection circuit according to the present invention detects the ground fault current GFC on the AC power supply path, and if the ground fault current GFC is generated by the manual test circuit, and the electromagnetic drive circuit will be activated to make the magnetic switch trip, and cut off the AC power supply on load and socket terminals, and thus the manual detection function for ground faults is achieved. If a ground fault occurs on the load sided, the electromagnetic drive circuit is activated to make the magnetic switch trip, and cut off the AC power supply on load and socket terminals, and thus the self ground fault protection function is achieved. If the ground fault current GFC is generated by the self ground fault detection unit, operation situations of the ground fault protection unit can be determined based on the fault status signal U_FS. If a fault is determined, the emergency interruption signal U_EI is generated to activate the electromagnetic drive circuit to make the ground fault protection unit trip in emergency, and cut off the AC power supply on load and socket terminals, and thus the emergency protection function is achieved.

The self fault detection unit father comprises an alarming circuit. The control circuit detects the fault status signal U_FS from the ground fault protection unit, when it is determined as fault, an alarming signal will be generated by the alarming circuit.

Further, the electromagnetic drive circuit comprises a diode 143, a trip coil 142, a silicon controlled rectifier SCR_A, a silicon controlled rectifier SCR_B, a diode 148 and a resistance 149. Wherein, the AC power supply is connected with the anode of the SCR_A via the diode 143 and the trip coil 142, the anode of the SCR_B is connected with the anode of the SCR_A, and the cathode of the SCR_B is connected with the cathode of the SCR_A. The cathode of the diode 148 is connected with the control pole of the SCR_A via the resistance 149, and the anode of the diode 148 is connected with the control pole of the SCR_B. The ground fault interruption signal U_GFI is connected with the control pole of the SCR_A via the resistance 149. The emergency interruption signal U_EI is connected with the control pole of the SCR_B. The fault status signal U_FS is output from the anode of the SCR_B and the anode of the SCR_A.

Further, the control circuit comprises an emergency protection circuit, a detection chip and auxiliary circuit. Wherein, the detection chip and auxiliary circuit receives the fault status signal U_FS and measures a running time Trun of the self fault detection process. When the running time Trun is greater than a maximum running time Tmax, the ground fault protection unit is judged to be at fault status, and an emergency control signal U_EC is generated. The emergency protection circuit receives, delays and amplifies the emergency control signal U_EC, and then outputs the emergency interruption signal U_EI. The maximum running time Tmax is set by the emergency protection circuit and/or the detection chip and auxiliary circuit.

The emergency protection circuit comprises an input resistor, a delay capacitor, an emergency triode and an output resistor. Wherein, the input resistor and the delay capacitor form a delay circuit. The emergency triode and the output resistor form an amplifying circuit. The base pole of the emergency triode receives the emergency control signal U_EC, and the emitter of the emergency triode outputs the emergency interruption signal U_EI.

During the self fault detection process, the control circuit generates a self detection demand, and then, after time of T1, outputs the emergency control signal U_EC to the emergency protection circuit. And then, after time of T2, the emergency protection circuit outputs the emergency interruption signal U_EI. The maximum running time Tmax mentioned above is equal to the sum of T1 and T2.

The ground fault detection circuit generates the ground fault interruption signal U_GFI, and triggers the SCR_A to turn on, drives the trip coil to make the magnetic switch trip, and the ground fault protection function is achieved. The emergency protection circuit generates the emergency interruption signal U_EI, and triggers the SCR_B and/or the SCR_A to turn on. The SCR_B and/or the SCR_A drive the trip coil to make the magnetic switch trip, and the emergency protection function is achieved.

The present invention is related to a circuit protection device with self fault detection function. The self fault detection unit in the circuit protection device can detect the operation time of the self fault detection process, and can achieve the emergency protection function under fault situations. The electromagnetic drive circuit in the ground fault protection unit utilizes a drive circuit comprised by two silicon controlled rectifiers, the SCR_A and the SCR_B, and achieves the emergency protection function under fault situations. The circuit is simple, economic and efficient.

EMBODIMENTS

The following is a detailed description for the present invention according to the attached drawings and embodiment, and the following embodiment is not limited to the present invention.

Figure 1:
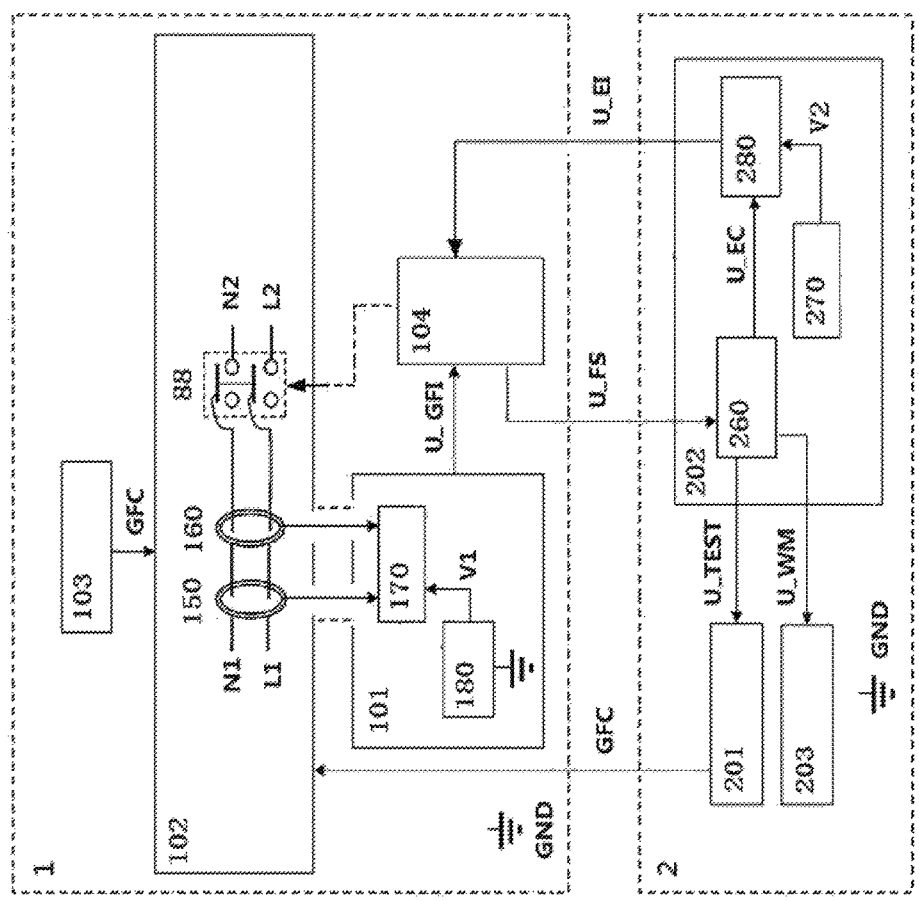
FIG. 1 shows a structural schematic diagram according to an embodiment of the present invention.

FIG. 1 shows a structural schematic diagram according to an embodiment of the present invention. It shows the major functional units and control relationships of the circuit protection device. The circuit protection device includes a ground fault protection unit 1 and a self fault detection unit 2.

The ground fault protection unit 1 achieves the ground fault protection function, and generates the fault status signal U_FS to the self fault detection unit 2. The self fault detection unit 2 generates the ground fault current GFC to the ground fault protection unit 1, and detects the fault status signal U_FS from the ground fault protection unit 1, and generates the emergency interruption signal U_EI to the ground fault protection unit 1, and achieves the self fault detection function and the emergency protection function.

The ground fault protection unit 1 comprises a ground fault detection circuit 101, an AC power supply path 102 and an electromagnetic drive circuit 104. Wherein, the AC power supply path 102 comprises a magnetic switch 88, input terminals of AC power supply N1, L1, load and socket terminals N2 and L2. The magnetic switch 88 is used to connect or disconnect the electrical path between input terminals of AC power supply and load and socket terminals.

Preferably, the ground fault protection unit 1 according to the embodiment further comprises a manual test circuit 103 which is used to generate manually the ground fault current GFC on the AC power supply path 102. The ground fault detection circuit 101 detects the ground fault current GFC on the AC power supply path 102, and generates the ground fault interruption signal U_GFI, and activates the electromagnetic drive circuit 104 to make the magnetic switch 88 trip, and cut off the AC power supply on load and socket terminals, and thus the ground fault protection function is tested. The manual test circuit 103 is to detect manually if the circuit is working correctly. If there is no manual test circuit 103, the operation of the circuit protection device is not affected.

The ground fault detection circuit 101 comprises a ground fault current sensor 150, a neutral repeat ground sensor 160, a first DC power source 180 and a ground fault detection chip 170. The ground fault current sensor 150 and the neutral repeat ground sensor 160 detect the ground fault current GFC on the AC power supply path 102, and send ground fault signals to the ground fault detection chip 170. The ground fault detection chip 170 detects ground fault signals, and outputs the ground fault interruption signal U_GFI. When a ground fault occurs on the AC power supply path 102 and load paths, the ground fault detection circuit 101 generates the ground fault interruption signal U_GFI. The positive electrode V1 of the first DC power supply 180 is connected with the ground fault detection chip 170. The negative electrode (anode) of the first DC power supply 180 acts as the logic ground GND of the circuit protection device.

The self fault detection unit 2 comprises an automatic detection circuit 201, a control circuit 202 and an alarming circuit 203. Wherein, the control circuit 202 generates a self fault detection signal U_TEST to start the self fault detection process, and controls the automatic detection circuit 201 to generate the ground fault current GFC to the ground fault protection unit 1, and detects the fault status signal U_FS from the ground fault protection unit 1, detects operation situations of the ground fault protection unit 1, and generates an alarming signal U_WM to the alarming circuit 203. When the fault of the ground fault protection unit 1 occurs, the control circuit 202 generates the emergency interruption signal U_EI to activate the electromagnetic drive circuit 104 to make the magnetic switch 88 trip, and the emergency protection function is achieved.

The control circuit 202 comprises an emergency protection circuit 280, a detection chip and auxiliary circuit 260 and a second DC power supply 270. Wherein, the detection chip and auxiliary circuit 260 performs the detection and control function of the control circuit 202, and generates the emergency control signal U_EC. The emergency protection circuit 280 receives, delays and amplifies the emergency control signal U_EC, and then generates the emergency interruption signal U_EI. Wherein, the second DC power supply 270 supplies a DC power V2 to the control circuit 202.

The self fault detection process is: the output U_TEST of the control circuit 202 is transferred from a low level to a high level, the self fault detection process is started, the automatic detection circuit 201 generates the ground fault current GFC to the ground fault protection unit 1. When the ground fault protection function of the ground fault protection unit 1 is at normal, the fault status signal U_FS of the ground fault protection unit 1 is transferred from a high level to a low level in a preset maximum running time Tmax (e.g. 40 ms) ("Normal condition"), i.e. during the self fault detection process, the ground fault detection circuit 101 detects the ground fault current GFC, the ground fault detection chip 170 generates the ground fault interruption signal U_GFI, which makes the SCR_A in the electromagnetic drive circuit 104 turn on, the fault status signal U_FS from the ground fault protection unit 1 is transferred from a high level to a low level, it means the status is normal. Subsequently, the U_TEST generated by the control circuit 202 is transferred from a high level to a low level, and the self fault detection process is completed. During the period, the time while the output U_TEST of the control circuit 202 is held at a high level is the running time Trun of the self fault detection process.

The maximum running time Tmax is determined by the emergency protection circuit 280 and/or the detection chip and auxiliary circuit 260. During the self fault detection process, the control circuit 202 generates the self detection demand (i.e., U_TEST is transferred from a low level to a high level), and then after the time of T1 ("the first delay time T1"), outputs the emergency control signal U_EC (i.e., the U_EC is transferred from a low level to a high level) to the emergency protection circuit 280. The emergency protection circuit 280 receives the emergency control signal U_EC, and after the delay time of T2 ("the second delay time T2"), outputs the emergency interruption signal U_EI (i.e., U_EI is transferred from a low level to a high level).

The maximum running time Tmax is equal to the sum of T1 and T2.

The control circuit 202 can judge the operation situation of the ground fault protection unit 1 by detecting the running time Trun of the self fault detection process. If the control circuit 202 fails to receive the fault status signal U_FS (i.e., U_FS is transferred from a high level to a low level) from the ground fault protection unit 1 showing the normal condition in the maximum running time Tmax, Trun is greater than Tmax, it can detect that the ground fault protection unit 1 fails. The control circuit 202 generates the emergency interruption signal U_EI (i.e., U_EI is transferred from a low level to a high level), and activates the electromagnetic drive circuit 104 to make the ground fault protection unit 1 trip, and cut off the AC power supply on load and socket terminals, and the emergency interruption function is achieved.

Figure 2:
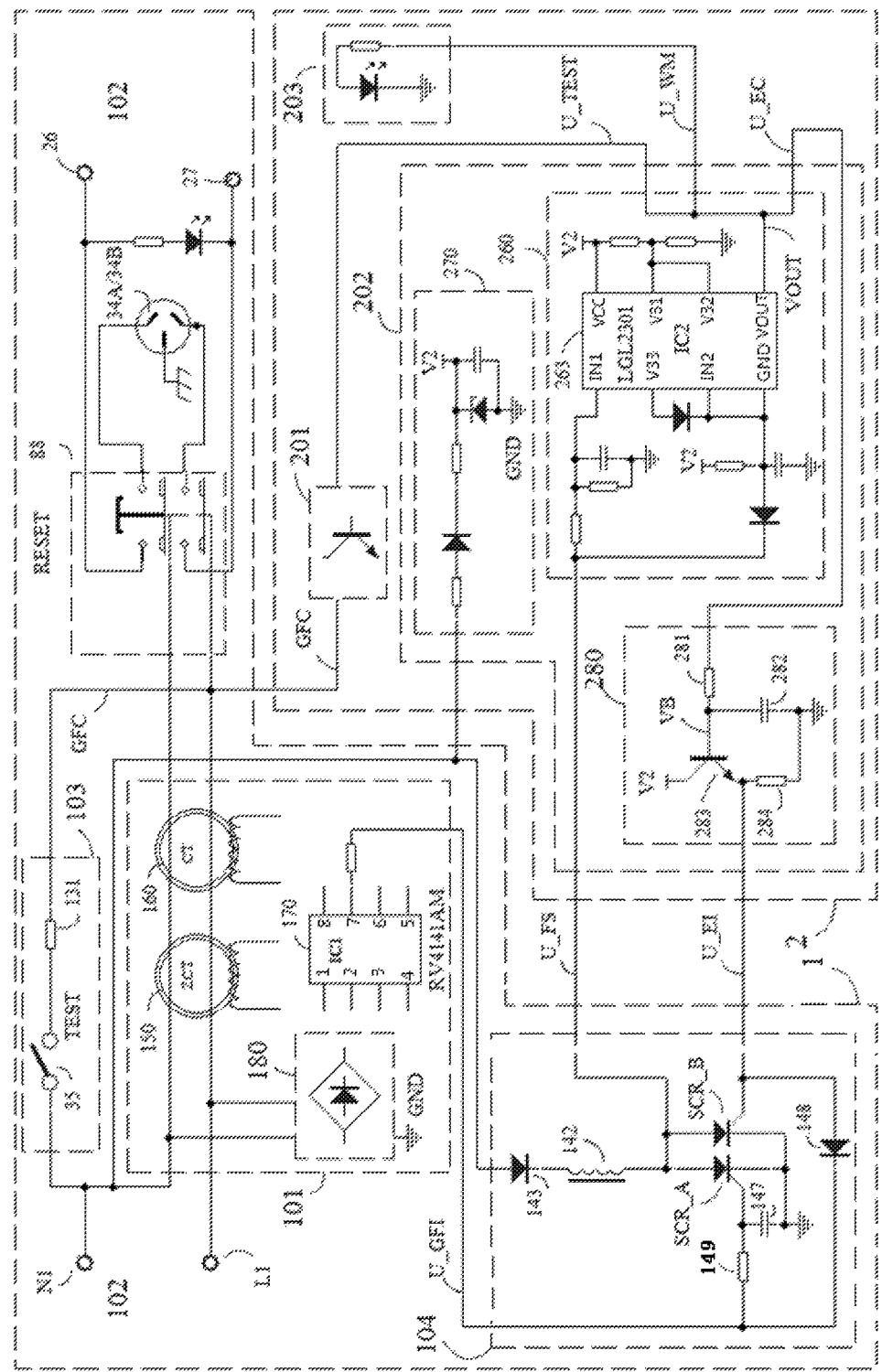
FIG. 2 shows a circuit schematic diagram according to an embodiment of the present invention.

FIG. 2 is a circuit schematic diagram according to the embodiment of the present invention. It shows a circuit embodiment of all functional units of the circuit protection device as shown in FIG. 1.

The AC power supply is connected to input terminals of the AC power supply L1 and N1, and passed through the ground fault current GFC sensor 150 and the neutral line repeat ground sensor 160, and then connected with movable contact blades of the magnetic switch 88, static contact blades of the magnetic switch 88 are connected respectively with load and socket terminals. In the embodiment, they are respectively connected with socket terminals 34A, 34B, and load terminals 26, 27.

The emergency protection circuit 280 comprises an input resistor 281, a delay capacitor 282, an emergency triode 283 and an output resistor 284. Wherein, one end of the input resistor 281 receives the emergency control signal U_EC from the detection chip and auxiliary circuit 260, and the other end of the input resistor 281 is connected with the base pole of the emergency triode 283. One end of the delay capacitor 282 is connected with the base pole of the emergency triode 283, and the other end of the delay capacitor 282 is connected with the logic ground GND. The collector of the emergency triode 283 is connected with the DC power V2 of the second DC power supply 270. One end of the output resistor 284 is connected with the emitter of the emergency triode 283, and the other end of the output resistor 284 is connected with the GND. The signal point of the emergency interruption signal U_EI is connected to the emitter of emergency triode 283. The input resistor 281 and the delay capacitor 282 form a delay circuit. The emergency triode 283 and the output resistor 284 form an amplifying circuit. The base pole of the emergency triode 283 receives the emergency control signal U_EC, and the emitter of the emergency triode 283 outputs the interruption signal U_EI.

The detection chip and auxiliary circuit 260 comprises a detection chip 263 and its auxiliary circuit. The output VOUT of the detection chip 263 is connected respectively with U_TEST, U_WM and U_EC. The detection chip 263 controls the automatic detection circuit 201, the alarming circuit 203 and the emergency protection circuit 280.

The output VOUT (i.e., U_TEST, U_WM and U_EC) of the detection chip 263 is transferred from a low level to a high level, the self fault detection process is started. During the self fault detection process, the self detection circuit 201 outputs the ground fault current GFC to the AC power supply path 102, and the ground fault current detection 101 detects the ground fault current GFC, and generates the ground fault interruption signal U_GFI (i.e., U_GFI is transferred from low level to high level), and triggers the SCR_A to turn on, and the fault status signal U_FS generated by the electromagnetic drive circuit 104 is transferred from high level to low level. After the detection chip 263 receives the fault status signal U_FS, the output VOUT (i.e., U_TEST, U_WM and U_EC) is transferred from a high level to a low level, the self fault detection process is completed. If the detection chip 263 fails to receive the normal signal of the fault status signal U_FS (i.e., in the normal condition, the U_FS should be transferred from a high level to a low level) within the maximum running time Tmax, it detects that the ground fault protection unit 1 fails. Then, the emergency interruption signal U_EI is transferred from low level to high level, and the electromagnetic drive circuit 104 is activated to make the ground fault protection unit 1 trip, and cut off the AC power supply on load and socket terminals, and the emergency interruption function is achieved.

In the present embodiment, during the self fault detection process, as the U_TEST and the U_EC come from the same signal VOUT, so the self fault detection signal U_TEST and the emergency control signal U_EC appear synchronously, i.e., the first delay time T1 is equal to zero.

The emergency protection circuit 280 receives the emergency control signal U_EC (i.e., U_EC is transferred from a low level to a high level), and then, after the second delay time T2, outputs the emergency interruption signal U_EI (i.e., U_EI is transferred from a low level to a high level). The delay process of the emergency protection circuit 280 is as follows: at the time t0, the U_EI is transferred from a low level to a high level, the current begins to charge the delay capacitor 282 through the resistor 281, and the voltage VB at the base pole of the emergency triode 283 rises gradually, the emergency triode 283 buffers and amplifies the voltage VB, and outputs the emergency interruption signal U_EI at its emitter, and the voltage of the U_EI raises gradually, finally, it makes SCR_B turn on at the time t1, and then makes the SCR_A turn on at the time t2. When the SCR_B does not failed, the second delay time T2 is equal to t1–t0. When the SCR_B fails, the second delay time T2 is equal to t2–t0.

The maximum running time Tmax mentioned above is equal to the sum of T1 and T2, i.e., T2 (as T1=0).

It is to be understood that the circuit diagram as shown in FIG. 2 is an embodiment of the present invention, the structure of the circuit can have other embodiment. For example, the outputs of U_TEST, U_WM and U_EC (i.e., the VOUT as mentioned above) are respectively connected with three pins of the detection chip 263, the outputs of U_TEST, U_WM and U_EC are different, the U_TEST and U_EC are not generated synchronously, the first delay time T1 is not equal to zero.

The electromagnetic drive circuit 104 comprises a diode 143, a trip coil 142, a SCR_A, a SCR_B, a resistor 149 and a diode 148. The AC power supply is connected with the anode of the SCR_A via the diode 143 and the trip coil 142. The cathode of the SCR_A is connected with the GND, the control pole of the SCR_A receives the ground fault interruption signal U_GFI from the ground fault detection circuit 101 via the resistor 149. The anode of the SCR_B is connected with the anode of the SCR_A, the cathode of the SCR_B is connected with the cathode of the SCR_A, and the control pole of the SCR-B receives the emergency interruption signal U_EI from the emergency protection circuit 280. The cathode of the diode 148 is connected with the control pole of the SCR_A via the resistor 149, and the anode of diode 148 is connected with the control pole of the SCR_B. So the ground fault interruption signal U_GFI is connected to the control pole of the SCR_A, and the emergency interruption signal U_EI is connected to the control pole of the SCR_B.

When ground faults occur, the ground fault interruption signal U_GFI is at a high level, the SCR_A turns on, at this time, as the diode 148 cuts off in reverse voltage, the SCR_B cannot turn on. When the ground fault detection circuit 101 and/or the SCR_A fail, the emergency interruption signal U_EI is at a high level, the emergency interruption signal U_EI makes the SCR_B turn on (when the SCR_B does not fail), and then makes the SCR_A turn on (when the SCR_A is not failure). So, when ground faults occur, the electromagnetic drive circuit 104 is at conductive status, the exciting current in the trip coil 142 is large enough to make the magnetic switch 88 trip and cut off the AC power supply on load and socket terminals, and the ground fault protection function is achieved. When the ground fault detection circuit 101 and/or the SCR_A fail, the emergency interruption signal U_EI triggers the electromagnetic drive circuit 104 to be at conductive status, the exciting current in the trip coil 142 is large enough to make the magnetic switch 88 trip and cut off the AC power supply on load and socket terminals, and the emergency protection function is achieved. As the spare element of the SCR_B, the SCR_A can improve the reliability of the emergency protection circuit.

It is important to note that the output U_TEST of the control circuit 202 in the present circuit protection device is transferred from a low level to a high level, the self fault detection process is started. The detection process and the conductive time of diode 143 are in different half waves of the AC power supply. During the detection process, the diode 143 is in cut-off status, and that cannot activate the trip coil 142 to make the magnetic switch 88 trip, and no need to describe in detailed.

It is to be understood that both the attached drawings and the embodiments of the present invention as claimed are intended to provide further explanations of the function, structure and principle, and not limited to the present invention. In addition, the objects of the present invention have been achieved. The above described embodiments may be modified without departing from the spirit or scope of the invention, thus, the present invention covers the scope described in the claims.

The invention claimed is:

1. A circuit protection device with self fault detection function, characterized in that, the circuit protection device comprises a ground fault protection unit (1) and a self fault detection unit (2), wherein the ground fault protection unit (1) comprises a ground fault detection circuit (101), an AC power supply path (102) and an electromagnetic drive circuit (104), and the self fault detection unit (2) comprises an automatic detection circuit (201) and a control circuit (202);

wherein, the ground fault detection circuit (101) is used to detect a ground fault current GFC on the AC power supply path (102), and generate a ground fault interruption signal U_GFI to activate the electromagnetic drive circuit (104), and ground fault protection function is achieved;

wherein the control circuit (202) periodically starts self fault detection process, and controls the automatic detection circuit (201) to output the ground fault current GFC to the ground fault protection unit (1), and detects a fault status signal U_FS from the electromagnetic drive circuit (104), and self fault detection is achieved, based on the fault status signal U_FS, operation situations of the ground fault protection unit (1) can be determined, and if a fault is determined, the control circuit (202) outputs an emergency interruption signal U_EI to activate the electromagnetic drive circuit (104), making the ground fault protection unit (1) trip in emergency to cut off the AC power supply on load and socket terminals, and emergency protection function is achieved.

2. The circuit protection device according to claim 1, characterized in that, the self fault detection unit (2) further comprises an alarming circuit (203), the control circuit (202) detects the fault status signal U_FS from the ground fault protection unit (1), and if a fault is determined, an alarming signal is generated via the alarming circuit (203).

3. The circuit protection device according to claim 1, characterized in that, the ground fault protection unit (1) further comprises a manual test circuit (103) which is used to generate manually the ground fault current GFC on the AC power supply path (102).

4. The circuit protection device according to claim 1, characterized in that, the electromagnetic drive circuit (104) comprises a diode (143), a trip coil (142), a silicon controlled rectifier SCR_A, a silicon controlled rectifier SCR_B, a diode (148) and a resistor (149), wherein, the AC power supply is connected with an anode of the SCR_A via the diode (143) and the trip coil (142), an anode of the SCR_B is connected with the anode of the SCR_A, and a cathode of the SCR_B is connected with a cathode of the SCR_A, the cathode of diode (148) is connected with the control pole of the SCR_A via the resistor (149), and the anode of the diode (148) is connected with the control pole of the SCR_B, the ground fault interruption signal U_GFI is connected with the control pole of the SCR_A via resistor (149), the emergency interruption signal U_EI is connected with a control pole of the SCR_B, the fault status signal U_FS is output from the anode of the SCR_B and the anode of the SCR_A.

5. The circuit protection device according to claim 4, characterized in that, the control circuit (202) comprises an emergency protection circuit (280), a detection chip and auxiliary circuit (260), wherein, the detection chip and auxiliary circuit (260) receives the fault status signal U_FS and measures the running time Trun of the self fault detection process, when the running time Trun is greater than the maximum running time Tmax, the ground fault protection unit (1) is determined to be at fault status, and an emergency control signal U_EC is generated, the emergency protection circuit (280) receives, delays and amplifies the emergency control signal U_EC, and then outputs the emergency interruption signal U_EI, the maximum running time Tmax is set by the emergency protection circuit (280) and/or the detection chip and auxiliary circuit (260).

6. The circuit protection device according to claim 5, characterized in that, the emergency protection circuit (280) comprises an input resistor (281), a delay capacitor (282), an emergency triode (283) and an output resistor (284), wherein, the input resistor (281) and the delay capacitor (282) form a delay circuit, the emergency triode (283) and the output resistor (284) form an amplifying circuit, the base pole of the emergency triode (283) receives the emergency control signal U_EC, and the emitter of the emergency triode (283) outputs the emergency interruption signal U_EI.

7. The circuit protection device according to claim 6, characterized in that, the AC power supply path (102) comprises a magnetic switch (88), input terminals of AC power supply, load and socket terminals, the magnetic switch (88) is used to connect or disconnect the electrical path between input terminals of AC power supply and load and socket terminals.

8. The circuit protection device according to claim 7, characterized in that, the ground fault detection circuit (101) generates the ground fault interruption signal U_GFI, and triggers the SCR_A to turn on, the SCR_A drives the trip coil (142) to make the magnetic switch (88) trip, and the ground fault protection function is achieved, the emergency protection circuit (280) generates the emergency interruption signal U_EI, and triggers the SCR_B and/or the SCR_A to turn on, the SCR_B and/or the SCR_A drives the trip coil (142) to make the magnetic switch (88) trip, and the emergency protection function is achieved.

* * * * *